United States Patent
Kyoto et al.

(10) Patent No.: US 10,965,089 B2
(45) Date of Patent: Mar. 30, 2021

(54) LASER DEVICE, LASER MACHINING APPARATUS, AND METHOD FOR CONTROLLING OUTPUT OF LASER DEVICE

(71) Applicant: Mitsubishi Electric Corporation, Tokyo (JP)

(72) Inventors: Tomohiro Kyoto, Tokyo (JP); Taira Ogita, Tokyo (JP); Takeshi Morimoto, Tokyo (JP); Hideyasu Machii, Tokyo (JP); Hiroaki Kurokawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/971,693

(22) PCT Filed: May 7, 2018

(86) PCT No.: PCT/JP2018/017671
§ 371 (c)(1),
(2) Date: Aug. 21, 2020

(87) PCT Pub. No.: WO2019/215798
PCT Pub. Date: Nov. 14, 2019

(65) Prior Publication Data
US 2020/0388980 A1    Dec. 10, 2020

(51) Int. Cl.
*H01S 3/134* (2006.01)
*H01S 3/097* (2006.01)
(Continued)

(52) U.S. Cl.
CPC ........ *H01S 3/09705* (2013.01); *B23K 26/032* (2013.01); *B23K 26/0608* (2013.01);
(Continued)

(58) Field of Classification Search
CPC .... H01S 3/09705; H01S 3/134; H01S 3/2366; H01S 3/2383; H01S 5/02469;
(Continued)

(56) References Cited

U.S. PATENT DOCUMENTS 3,780,296 A * 12/1973 Waksberg ............. G02F 1/0123
                                                                250/201.1
3,877,813 A *  4/1975 Hayes ........................ G01J 9/04
                                                                356/484
(Continued)

FOREIGN PATENT DOCUMENTS

JP    2003-338660 A  * 11/2003
JP    2005-317841 A    11/2005
(Continued)

OTHER PUBLICATIONS

International Search Report and Written Opinion dated Jul. 3, 2018 for PCT/JP2018/017671 filed on May 7, 2018, 10 pages including English Translation of the International Search Report.
(Continued)

*Primary Examiner* — Jimmy Chou
(74) *Attorney, Agent, or Firm* — Xsensus LLP

(57) ABSTRACT

A laser device, including multiple laser modules, includes a plurality of drive power units that drive the laser modules, a plurality of output detection units that detect laser outputs from the laser modules, and output detected values as first output signals, a coupled output detection unit that detects a total laser output after coupling of a plurality of the laser outputs, and outputs a detected value as a second output signal, a computing unit that sets multiple output correction factors for correspondingly controlling the laser modules using the plurality of first output signals and the second output signal, and a control unit that controls the plurality of drive power units using the multiple output correction factors. The multiple output correction factors are each set to
(Continued)

allow the total laser output to be maintained at a constant value.

11 Claims, 8 Drawing Sheets

(51) Int. Cl.
   *B23K 26/70* (2014.01)
   *B23K 26/03* (2006.01)
   *B23K 26/06* (2014.01)
   *G05B 15/02* (2006.01)
   *H01S 3/13* (2006.01)
   *H01S 3/23* (2006.01)

(52) U.S. Cl.
   CPC .......... *B23K 26/702* (2015.10); *B23K 26/705* (2015.10); *G05B 15/02* (2013.01); *H01S 3/134* (2013.01); *H01S 3/1305* (2013.01); *H01S 3/2366* (2013.01); *H01S 3/2383* (2013.01)

(58) Field of Classification Search
   CPC .. B23K 26/702; B23K 26/705; B23K 26/032; B23K 26/0608; G05B 15/02
   USPC .............. 219/121.6, 121.61, 121.74, 121.75, 219/121.76, 121.78, 121.83; 372/29, 30, 372/31, 33, 38
   See application file for complete search history.

(56) References Cited

U.S. PATENT DOCUMENTS

| | | | | |
|---|---|---|---|---|
| 4,071,751 | A * | 1/1978 | Waksberg | G02F 1/0123 250/201.1 |
| 4,092,530 | A * | 5/1978 | Wise | H01S 3/131 250/205 |
| 4,096,448 | A * | 6/1978 | Hayes | H01S 3/1394 372/18 |
| 4,700,150 | A * | 10/1987 | Hall | G02F 1/03 359/279 |
| 4,783,787 | A * | 11/1988 | Doi | A61B 18/20 372/108 |
| 5,025,447 | A * | 6/1991 | Ohashi | H01S 5/0683 372/31 |
| 5,124,993 | A * | 6/1992 | Braunlich | G01T 1/115 372/101 |
| 5,334,826 | A * | 8/1994 | Sato | H01S 5/0021 235/462.06 |
| 5,408,482 | A * | 4/1995 | Nagano | H01S 3/10 372/31 |
| 5,850,409 | A * | 12/1998 | Link | H01S 5/06832 372/38.01 |
| 6,002,706 | A * | 12/1999 | Staver | B23K 26/702 359/698 |
| 6,130,754 | A * | 10/2000 | Greene | B23K 26/702 356/445 |
| 6,816,535 | B2 * | 11/2004 | Ho | G01B 11/272 372/107 |
| 6,865,196 | B2 * | 3/2005 | Dobbs | G01J 3/4338 250/200 |
| 6,879,421 | B2 * | 4/2005 | Clark | G01J 3/26 356/237.2 |
| 7,257,136 | B2 * | 8/2007 | Mori | H01S 3/134 219/121.62 |
| 8,374,206 | B2 * | 2/2013 | Peng | H01S 3/117 372/27 |
| 9,685,758 | B2 * | 6/2017 | Takigawa | H01S 5/4012 |
| 10,239,155 | B1 * | 3/2019 | Stewart | B23K 26/0626 |
| 10,431,953 | B2 * | 10/2019 | Miyata | B23K 26/705 |
| 10,615,570 | B2 * | 4/2020 | Gapontsev | H01S 3/094069 |
| 2004/0019459 | A1 * | 1/2004 | Dietz et al. | |
| 2004/0056010 | A1 * | 3/2004 | Ho | G01B 11/272 219/121.78 |
| 2006/0088074 | A1 * | 4/2006 | Johnstone | H01S 3/2383 372/70 |
| 2006/0114959 | A1 * | 6/2006 | Egawa | H01S 3/09705 372/61 |
| 2008/0253415 | A1 * | 10/2008 | Livingston | G02B 27/0905 372/38.01 |
| 2008/0253417 | A1 * | 10/2008 | Livingston | B23K 26/0613 372/38.02 |
| 2013/0070796 | A1 * | 3/2013 | Belloni | H05B 45/24 372/38.01 |
| 2013/0322473 | A1 * | 12/2013 | Palaniyappan | H01S 3/0014 372/21 |
| 2014/0294027 | A1 * | 10/2014 | Nukui | H01S 3/09702 372/38.02 |
| 2015/0375337 | A1 * | 12/2015 | Hayashi | B23K 26/40 219/121.61 |
| 2016/0036194 | A1 * | 2/2016 | Sato | H01S 3/094053 359/345 |
| 2017/0133819 | A1 * | 5/2017 | Takigawa | H01S 5/0683 |
| 2017/0279246 | A1 * | 9/2017 | Muendel | B23K 26/702 |
| 2019/0176264 | A1 * | 6/2019 | Kyoto | H01S 5/40 |
| 2019/0267240 | A1 * | 8/2019 | Ohmori | H01L 21/02691 |
| 2019/0271588 | A1 * | 9/2019 | Wang | B23K 26/03 |
| 2020/0130107 | A1 * | 4/2020 | Mochizuki | B23K 26/36 |

FOREIGN PATENT DOCUMENTS

| | | | | |
|---|---|---|---|---|
| JP | 2005317841 | A * | 11/2005 | |
| JP | 2017-092206 | A | 5/2017 | |
| JP | 2017092206 | A * | 5/2017 | ........ H01S 5/02469 |
| JP | 2017-108009 | A | 6/2017 | |
| JP | 2017108009 | A * | 6/2017 | |
| WO | 2004/011897 | A1 * | 2/2004 | |
| WO | WO-2004011897 | A1 * | 2/2004 | ........ B23K 26/0613 |

OTHER PUBLICATIONS

Notification of Reasons for Refusal received for Japanese Patent Application No. 2018-550852, dated Dec. 18, 2018, 10 pages including English Translation.

Decision to Grant a Patent received for Japanese Patent Application No. 2018-550852, dated Mar. 12, 2019, 5 pages including English Translation.

* cited by examiner

LASER DEVICE, LASER MACHINING APPARATUS, AND METHOD FOR CONTROLLING OUTPUT OF LASER DEVICE

CROSS-REFERENCE TO RELATED APPLICATIONS

The present application is based on PCT filing PCT/JP2018/017671, filed May 7, 2018, the entire contents of which are incorporated herein by reference.

FIELD

The present invention relates to a laser device that controls an output of a laser beam, a laser machining apparatus, and a method for controlling an output of a laser device.

BACKGROUND

Some of laser devices that output a laser beam, each couple laser beams output from multiple laser modules and output the resultant laser beam. The laser device described in Patent Literature 1 includes an optical coupling unit that couples laser beams output from multiple laser modules, first light detection units that each detect a laser output value at a corresponding one of the laser modules, and a second light detection unit that detects a laser output value at the optical coupling unit. The laser device described in Patent Literature 1 determines whether there is fault or degradation in the laser device based on detection results of the first light detection units and of the second light detection unit.

CITATION LIST

Patent Literature

Patent Literature 1: Japanese Patent Application Laid-open No. 2017-092206

SUMMARY

Technical Problem

The laser device of Patent Literature 1 listed above is not capable of independently controlling the individual laser modules, and therefore, upon a decrease in the coupled laser output, restores the coupled laser output that is output from the laser device by increasing the output of each of the multiple laser modules at a fixed rate to restore the coupled laser output to the previous output value. This increases the output of a degraded laser module also at a fixed rate, thereby presenting a problem of further degradation of the degraded laser module.

The present invention has been made in view of the foregoing, and it is an object of the present invention to provide a laser device capable of reducing further degradation of a degraded laser module while maintaining the laser output value after coupling of the laser beams within an acceptable range.

Solution to Problem

An aspect of the present invention is directed to a laser device including a plurality of laser modules, that includes a plurality of drive power units that drive the laser modules, a plurality of laser output detection units that detect laser outputs from the laser modules, and output detected values as first output signals, and a coupled output detection unit that detects a total laser output after coupling of the laser outputs, and outputs a detected value as a second output signal. The laser device also includes a computing unit that sets a plurality of output correction factors for correspondingly controlling the laser modules using the plurality of first output signals and the second output signal, and a control unit that controls the plurality of drive power units using the multiple output correction factors. The multiple output correction factors are each set to allow the total laser output to be maintained at a constant value.

Advantageous Effects of Invention

A laser device according to the present invention provides an advantage in being capable of reducing further degradation of a degraded laser module while maintaining the laser output value after coupling of the laser beams within an acceptable range.

DESCRIPTION OF EMBODIMENT

A laser device, a laser machining apparatus, and a method for controlling an output of a laser device according to an embodiment of the present invention will be described in detail below with reference to the drawings. Note that this embodiment is not intended to limit the scope of this invention.

Embodiment

Figure 1:
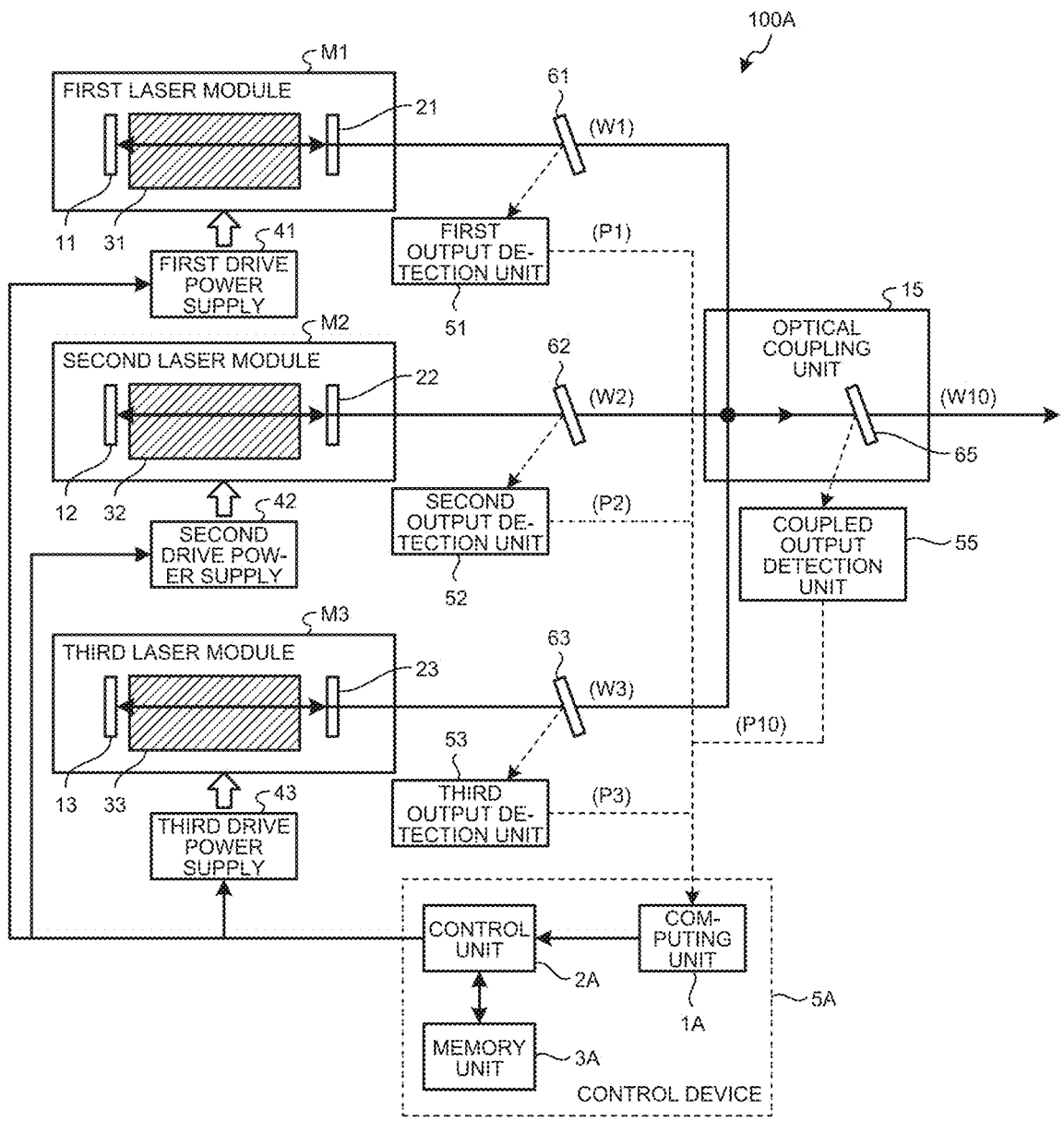
FIG. 1 is a diagram illustrating a configuration of a laser device according to an embodiment.

FIG. 1 is a diagram illustrating a configuration of a laser device according to an embodiment. A laser device 100A includes a first laser module M1, a second laser module M2, and a third laser module M3. The laser device 100A also includes a first drive power supply 41, a second drive power supply 42, and a third drive power supply 43 as multiple drive power units. The laser device 100A further includes partial reflection mirrors 61 to 63, a first output detection unit 51, a second output detection unit 52, and a third output detection unit 53. The laser device 100A also includes an optical coupling unit 15, a coupled output detection unit 55, and a control device 5A.

The first laser module M1, the first drive power supply 41, and the first output detection unit 51 together constitute one laser unit that outputs and detects a laser beam. The second laser module M2, the second drive power supply 42, and the second output detection unit 52 also together constitute one laser unit that outputs and detects a laser beam. The third laser module M3, the third drive power supply 43, and the third output detection unit 53 also together constitute one laser unit that outputs and detects a laser beam. Note that the laser unit including the first output detection unit 51 may include the partial reflection mirror 61 as a component thereof; the laser unit including the second output detection unit 52 may include the partial reflection mirror 62 as a component thereof; and the laser unit including the third output detection unit 53 may include the partial reflection mirror 63 as a component thereof. The present embodiment is described in the context of the laser device 100A including three laser modules, i.e., the first laser module M1, the second laser module M2, and the third laser module M3, but the laser device 100A may include two, or four or more, laser modules.

The first laser module M1 is a module that outputs a laser beam W1, and includes, in a housing, a total reflection mirror 11, a partial reflection mirror 21, and an excitation unit 31. The second laser module M2 is a module that outputs a laser beam W2, and includes, in a housing, a total reflection mirror 12, a partial reflection mirror 22, and an excitation unit 32. The third laser module M3 is a module that outputs a laser beam W3, and includes, in a housing, a total reflection mirror 13, a partial reflection mirror 23, and an excitation unit 33.

The first laser module M1, the second laser module M2, and the third laser module M3 have similar functions to each other. That is, the total reflection mirrors 12 and 13 each have a similar function to the function of the total reflection mirror 11. The partial reflection mirrors 22 and 23 each have a similar function to the function of the partial reflection mirror 21. The excitation units 32 and 33 each have a similar function to the function of the excitation unit 31.

The following description will focus on a configuration of the first laser module M1. The first laser module M1 may use any type of laser including a gas laser, a fiber laser, or a direct diode laser. The present embodiment will be described on the assumption that the first laser module M1 is a laser module using a gas laser. The housing of the first laser module M1 contains laser gas sealed therein, such as carbon dioxide ($CO_2$), carbon monoxide (CO), helium (He), nitrogen ($N_2$), or hydrogen ($H_2$), serving as the laser medium of the gas laser. In the first laser module M1, electric discharge in the excitation unit 31 excites the laser gas, and light generated therefrom travels back and forth repeatedly between the total reflection mirror 11 and the partial reflection mirror 21, thereby producing resonance. The partial reflection mirror 21 allows a part of incident light to pass therethrough. The light transmitted through the partial reflection mirror 21 is then output from the first laser module M1 as the laser beam W1.

Note that, in the following description, the first laser module M1, the second laser module M2, or the third laser module M3 may also be referred to as laser module Mx. In addition, the first laser module M1, the second laser module M2, and the third laser module M3 may be referred to collectively as laser module group. Moreover, the first drive power supply 41, the second drive power supply 42, or the third drive power supply 43 may also be referred to as drive power supply 40x. Furthermore, the first drive power supply 41, the second drive power supply 42, and the third drive power supply 43 may be referred to collectively as drive power supply group.

A part of the laser beam W1 from the first laser module M1 is reflected by the partial reflection mirror 61, and is directed to the first output detection unit 51. The rest thereof passes through the partial reflection mirror 61, and is directed to the optical coupling unit 15. The partial reflection mirror 61 allows almost all the laser beam to pass therethrough, thereby causing the part of the laser beam reflected by the partial reflection mirror 61 to have significantly low power. Accordingly, the present embodiment is described on the assumption that the laser beam from the first laser module M1 and the laser beam directed to the optical coupling unit 15 have a same amount of power. The laser beam from the first laser module M1 and the laser beam having passed through the partial reflection mirror 61 are thus hereinafter both referred to as laser beam W1. Similarly, the laser beam from the second laser module M2 and the laser beam having passed through the partial reflection mirror 62 are both referred to as laser beam W2; and the laser beam from the third laser module M3 and the laser beam having passed through the partial reflection mirror 63 are both referred to as laser beam W3. In the following description, any of the laser beams W1, W2, and W3 may also be referred to as laser beam Wx. In addition, the laser beams W1, W2, and W3 may be referred to collectively as laser beam group.

The first output detection unit 51, the second output detection unit 52, and the third output detection unit 53 are each a laser output detection unit, such as a sensor for detecting an output value of the laser beam Wx, which indicates the power of the laser beam Wx. The first output detection unit 51 detects the laser beam incident from the partial reflection mirror 61, converts the detected laser beam into an output signal P1, which is an electrical signal (voltage), and transmits the output signal P1 to the control device 5A. The output signal P1 corresponds to the output value of the laser beam W1 output from the first laser module M1.

The second output detection unit 52 detects the laser beam incident from the partial reflection mirror 62, converts the detected laser beam into an output signal P2, which is an electrical signal, and transmits the output signal P2 to the control device 5A. The output signal P2 corresponds to the output value of the laser beam W2 output from the second laser module M2.

The third output detection unit 53 detects the laser beam incident from the partial reflection mirror 63, converts the detected laser beam into an output signal P3, which is an electrical signal, and transmits the output signal P3 to the control device 5A. The output signal P3 corresponds to the output value of the laser beam W3 output from the third laser module M3. In the following description, the first output detection unit 51, the second output detection unit 52, and the third output detection unit 53 may be referred to collectively as output detection unit group.

The laser beam W1 having passed through the partial reflection mirror 61, the laser beam W2 having passed through the partial reflection mirror 62, and the laser beam W3 having passed through the partial reflection mirror 63 are directed to the optical coupling unit 15.

The optical coupling unit 15 couples together the laser beams W1, W2, and W3 from the laser module group. In the following description, the laser beams W1, W2, and W3 after the coupling may also be referred to as coupled laser beam. The optical coupling unit 15 includes a partial reflection mirror 65. A part of the coupled laser beam is reflected by the partial reflection mirror 65, and is directed to the coupled output detection unit 55. The rest thereof passes through the partial reflection mirror 65, and is output out of the laser device 100A. The partial reflection mirror 65 allows almost all the laser beam to pass therethrough, thereby causing the part of the laser beam reflected by the partial reflection mirror 65 to have significantly low power. Accordingly, the present embodiment is described on the assumption that the laser beam incident on the partial reflection mirror 65 and the laser beam going out of the partial reflection mirror 65 have a same amount of power. Thus, the laser beam incident on the partial reflection mirror 65 and the laser beam going out of the partial reflection mirror 65 are hereinafter both referred to as coupled laser beam W10.

The coupled output detection unit 55 is a sensor for detecting an output value of the coupled laser beam W10, which indicates the power of the coupled laser beam W10. The coupled output detection unit 55 detects the laser beam incident from the partial reflection mirror 65, converts the detected laser beam into an output signal P10, which is an electrical signal, and transmits the output signal P10 to the control device 5A. The output signal P10 corresponds to a total laser output, which is output after the coupling of the laser beams W1, W2, and W3 by the optical coupling unit 15, that is, an output value of the coupled laser beam W10. The output signals P1 to P3 are each a first output signal, and the output signal P10 is a second output signal.

The control device 5A is a device that controls the laser module group and the drive power supply group. The control device 5A includes a computing unit 1A, a control unit 2A, and a memory unit 3A.

The memory unit 3A stores, on a per laser module Mx basis, correspondence relationship information, which represents correspondence relationship between the power to be supplied to the drive power supply group and the output value of the laser beam Wx. The memory unit 3A stores the correspondence relationship information in an initial state of the laser device 100A, and the correspondence relationship information for correcting the output values of the laser beam group. The information of the power to be supplied to the drive power supply group includes the current value of the drive current and the voltage value of the drive voltage of each of the laser modules Mx (hereinafter referred to as each laser module Mx).

The output values of the laser beams Wx included in the correspondence relationship information include an initial value, i.e., an output value in the initial state, a latest output value, and the like, of the laser device 100A. The initial value of a laser beam Wx is the output value of that laser beam Wx that has been output at a time of setting of the initial state of the laser device 100A. An example of the time of setting of the initial state is a time after elapse of a time period of possible occurrence of early failure of a laser module Mx and before elapse of a specific time period in a lifetime expected for that laser module Mx. The lifetime expected for a laser module Mx is a total expected energization time, i.e., the total time of the time expected to be energizable, of that laser module Mx. An example of the specific time period in the lifetime expected for a laser module Mx is $1/100$ of the total energization time. The lifetime and the specific time period both correspond to a time when that laser module Mx is in operation, and exclude a time not in operation.

The memory unit 3A also stores the output value of the coupled laser beam W10. Types of the output value of the coupled laser beam W10 stored in the memory unit 3A include an initial value of the output value, a latest output value, and the like. The initial value of the coupled laser beam W10 corresponds to the initial values of the output values of the laser beams W1, W2, and W3. The initial values of the laser beams W1, W2, and W3 and of the coupled laser beam W10 are used as reference values for use in correction of the laser output value. The memory unit 3A further stores an upper limit value of the output value of a laser beam Wx; an upper limit value of an output correction factor for correction of the output value of a laser beam Wx; and a measurement error range of the output value of a laser beam Wx. The output correction factor is a correction factor for the output of a laser beam Wx. The correspondence relationship information and the output value of the coupled laser beam W10 constitute information representing the device status of the laser device 100A. The correspondence relationship information for the initial state of the laser device 100A and the initial value of the output value of the coupled laser beam W10 serve as reference information of the device status of the laser device 100A.

The computing unit 1A sets the output correction factor for correction of the output value of the laser beam Wx. If the output value of the laser beam Wx needs to be increased by 10%, the computing unit 1A sets the output correction factor to 10%. The computing unit 1A of the present embodiment sets a lower output correction factor to a more degraded laser module Mx, and sets a higher output correction factor to a less degraded laser module Mx while maintaining the output value of the coupled laser beam W10 within an acceptable range. In other words, the computing unit 1A sets the output correction factors of the laser module group so as to set a lower output correction factor to a more degraded laser module Mx, and at the same time, to maintain the output value of the coupled laser beam W10 within a specific range as a whole. The computing unit 1A sets the output correction factors, for example, to maintain the output value of the coupled laser beam W10 at a constant value. The term "constant value" as used herein also refers to a generally constant value. That is, it suffices that the constant value falls within a range allowing the value to be deemed as a particular value. The control unit 2A calculates the values of the power to be supplied to the drive power supply group that reflect the output correction factors, using the correspondence relationship information in the memory unit 3A and/or the like. The control unit 2A sends the calculated values of the power to be supplied, to the drive power supply group.

Figure 2:
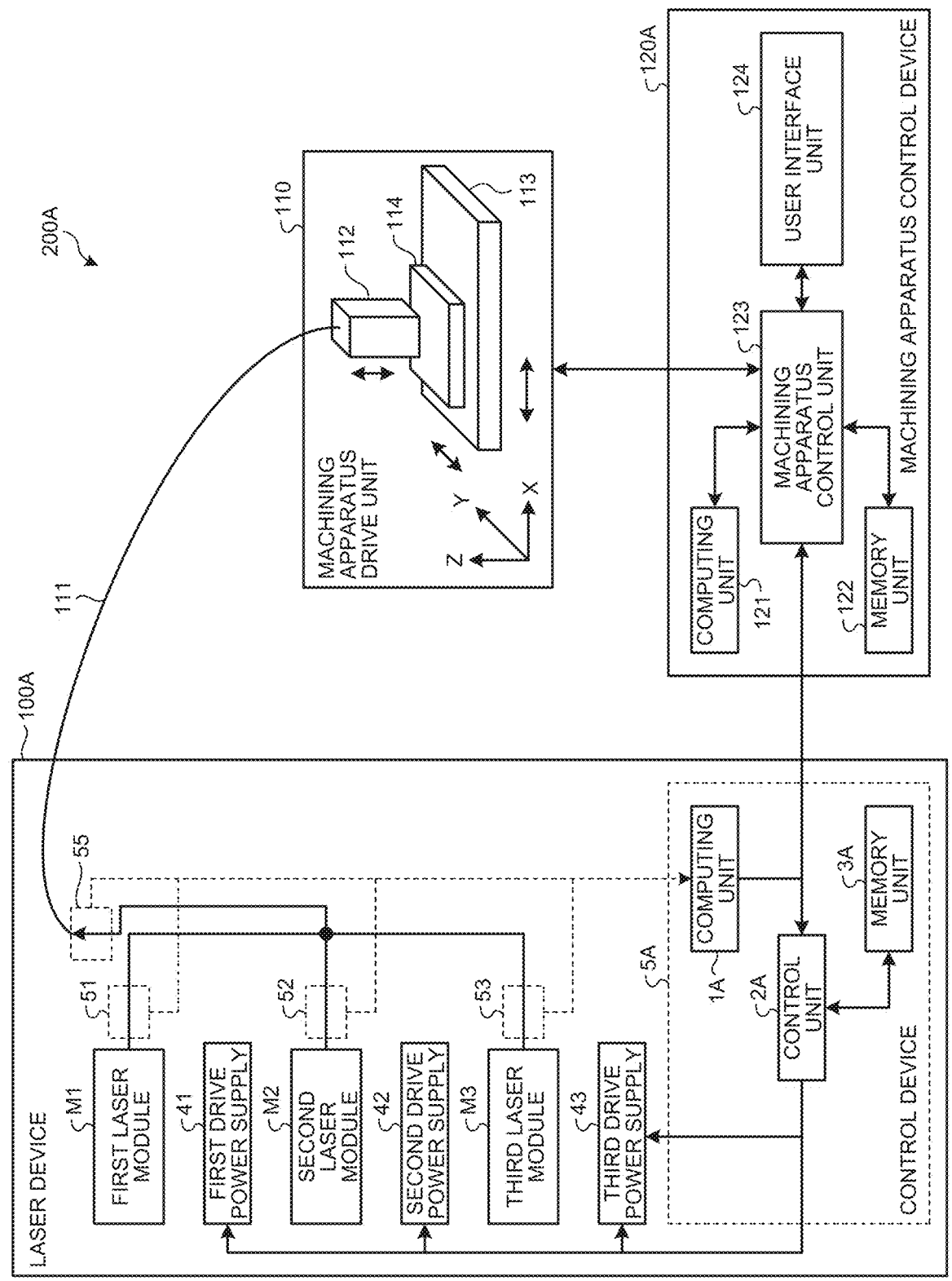
FIG. 2 is a diagram illustrating a first example configuration of a laser machining apparatus including the laser device according to the embodiment.

A configuration of a laser machining apparatus including the laser device 100A will now be described. FIG. 2 is a diagram illustrating a first example configuration of a laser machining apparatus including the laser device according to the embodiment. FIG. 2 omits illustration of the optical coupling unit 15. A laser machining apparatus 200A includes the laser device 100A, a transmission fiber 111, a machining apparatus drive unit 110, which is a machining unit, and a machining apparatus control device 120A.

The laser device 100A is connected to the transmission fiber 111 that transmits the coupled laser beam W10, and transmits the coupled laser beam W10 through the transmission fiber 111 to the machining apparatus drive unit 110. In addition, the control unit 2A of the laser device 100A sends information representing the state of the laser device 100A etc. to a machining apparatus control unit 123. The information representing the state of the laser device 100A is used in feedback control by the machining apparatus control device 120A.

The machining apparatus drive unit 110 performs machining of a workpiece 114, which is the item to be worked, using the coupled laser beam W10 transmitted from the laser device 100A. The machining apparatus drive unit 110 includes a machining head 112 and a worktable 113.

The machining head 112 is connected through the transmission fiber 111 to the laser device 100A, and emits the coupled laser beam W10 transmitted through the transmission fiber 111 onto the workpiece 114. The machining head 112 is movable along the vertical direction, i.e., Z-axis direction. The worktable 113 is a table for placing the workpiece 114 thereon. The worktable 113 is movable along X-axis and Y-axis directions in the horizontal plane.

The machining apparatus control device 120A controls the machining apparatus drive unit 110 and the laser device 100A. The machining apparatus control device 120A includes a computing unit 121, a memory unit 122, the machining apparatus control unit 123, and a user interface unit 124. The machining apparatus control unit 123 is connected to the computing unit 121, the memory unit 122, the user interface unit 124, the control unit 2A, and the machining apparatus drive unit 110. The user interface unit 124 receives information that is input by the user, and sends the information to the machining apparatus control unit 123. In addition, the user interface unit 124 outputs various information to an external device according to a command from the machining apparatus control unit 123.

The computing unit 121 calculates the position of the machining head 112, the position of the worktable 113, and the like, based on state information representing the state of the machining apparatus drive unit 110. The memory unit 122 stores a control program for controlling the machining apparatus drive unit 110 and the laser device 100A.

The machining apparatus control unit 123 receives the state information of the machining apparatus drive unit 110 from the machining apparatus drive unit 110, and sends the state information to the computing unit 121. The machining apparatus control unit 123 also receives various commands for controlling the machining apparatus drive unit 110 and the laser device 100A, from the laser device 100A. In addition, the machining apparatus control unit 123 sends a command for controlling the machining apparatus drive unit 110 to the machining apparatus drive unit 110.

Moreover, the machining apparatus control unit 123 stores information generated by the machining apparatus control unit 123, in the memory unit 122. The machining apparatus control unit 123 also stores, in the memory unit 122, information received from the machining apparatus drive unit 110 and from the laser device 100A.

The machining apparatus control unit 123 calculates commands to send to the machining apparatus drive unit 110 and to the laser device 100A using a result of computation of the computing unit 121 and using a control program in the memory unit 122. The machining apparatus control unit 123 controls the machining apparatus drive unit 110 and the laser device 100A by sending the calculated commands to the machining apparatus drive unit 110 and the laser device 100A.

Figure 3:
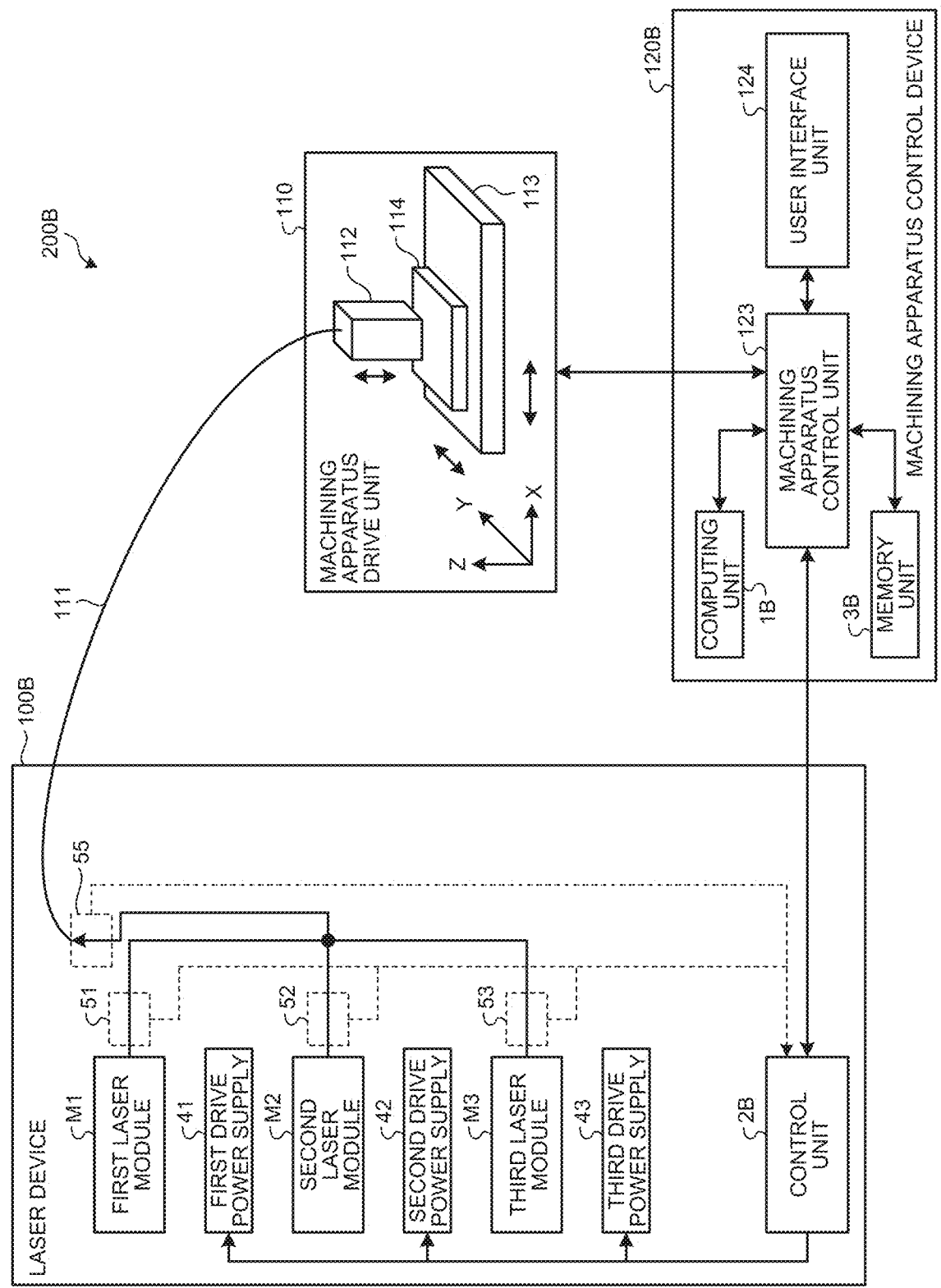
FIG. 3 is a diagram illustrating a second example configuration of a laser machining apparatus including the laser device according to the embodiment.

FIG. 3 is a diagram illustrating a second example configuration of a laser machining apparatus including the laser device according to the embodiment. FIG. 3 omits illustration of the optical coupling unit 15. Of the elements illustrated in FIG. 3, elements that provide functionality identical to the functionality of the laser device 100A illustrated in FIG. 2 are indicated by the same reference characters, and duplicate description will be omitted. A laser machining apparatus 200B includes a laser device 100B, the transmission fiber 111, the machining apparatus drive unit 110, and a machining apparatus control device 120B.

The laser device 100B includes a control unit 2B in place of the control unit 2A. In the laser machining apparatus 200B, a computing unit 1B, which has both the functionality of the computing unit 1A and the functionality of the computing unit 121, is disposed in the machining apparatus control device 120B. In addition, in the laser machining apparatus 200B, a memory unit 3B, which has both the functionality of the memory unit 3A and the functionality of the memory unit 122, is disposed in the machining apparatus control device 120B. Note that at least one of the computing unit 1B and the memory unit 3B may be disposed in the laser device 100B.

The machining apparatus control device 120B includes the computing unit 1B, the memory unit 3B, the machining apparatus control unit 123, and the user interface unit 124. The machining apparatus control unit 123 is connected to the computing unit 1B, the memory unit 3B, the user interface unit 124, the control unit 2B, and the machining apparatus drive unit 110.

The output signals P1, P2, P3, and P10 detected in the laser device 100B is transmitted by the control unit 2B to the computing unit 1B through the machining apparatus control unit 123. This enables the computing unit 1B to set the output correction factors in a processing similar to that of the computing unit 1A. The machining apparatus control unit 123 sends the output correction factors calculated by the computing unit 1B to the control unit 2B. In addition, the control unit 2B reads information in the memory unit 3B through the machining apparatus control unit 123.

The control unit 2B controls the drive power supply group in a processing similar to the control unit 2A. Specifically, the control unit 2B calculates the values of the power to be supplied to the drive power supply group that reflect the output correction factors, using the correspondence relationship information in the memory unit 3B and/or the like. The control unit 2B sends the calculated values of the power to be supplied, to the drive power supply group.

Figure 4:
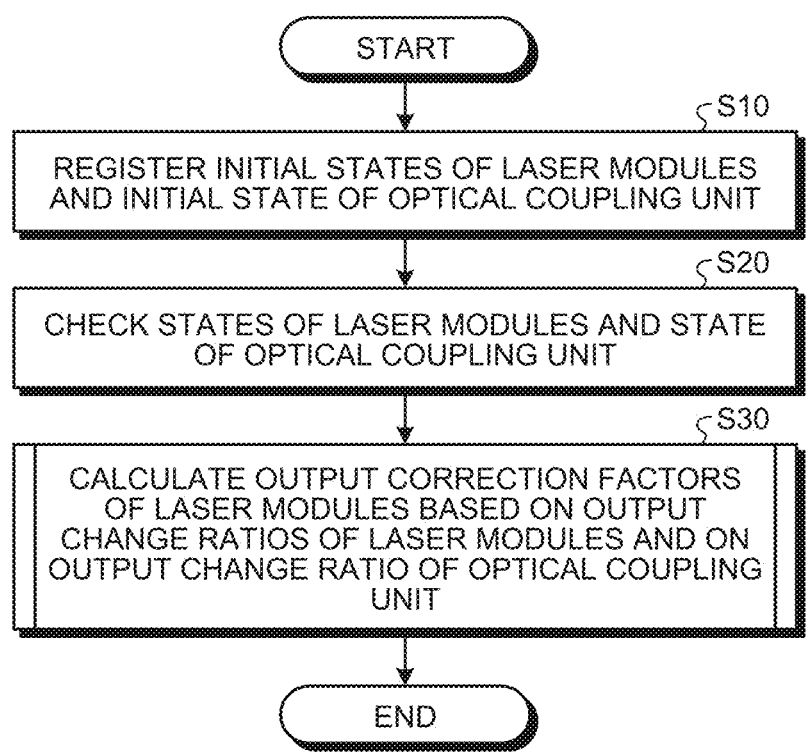
FIG. 4 is a flowchart illustrating a processing procedure of the laser device according to the embodiment.

FIG. 4 is a flowchart illustrating a processing procedure of the laser device according to the embodiment. Due to similar processing performed by the laser device 100A and by the laser device 100B, the following description will focus on a processing procedure of the laser device 100A. Upon connection of the first laser module M1, the second laser module M2, and the third laser module M3 to the optical coupling unit 15, the control device 5A registers the initial states of the laser modules Mx and the initial state of the optical coupling unit 15 (step S10). Specifically, the control device 5A registers the initial values of the laser output values of the laser modules Mx and the initial value of the laser output value of the optical coupling unit 15. The initial values of the output values of the respective laser beams W1, W2, and W3 are each a first initial value, and the initial value of the output value of the coupled laser beam W10 is a second initial value.

An operation of registration of the initial state will now be described. At the time for registration of the initial state of the laser device 100A, the control unit 2A supplies power to the drive power supply group. In this operation, the control unit 2A may supply different amounts of power on a per drive power supply 40x basis.

In the laser device 100A, the first output detection unit 51, the second output detection unit 52, and the third output detection unit 53 respectively detect the laser beams W1, W2, and W3 from the laser modules Mx, and the coupled output detection unit 55 detects the coupled laser beam W10 from the optical coupling unit 15. In this operation, the output values of the laser beams W1, W2, and W3 and of the coupled laser beam W10 are detected upon elapse of a specific time period after start-up of the laser modules Mx. That is, the output values of the laser beams W1, W2, and W3 and of the coupled laser beam W10 are detected after completion of a particular operation after start-up of the laser modules Mx. The output values of the laser beams W1, W2, and W3 and of the coupled laser beam W10 detected after completion of this particular operation are the initial values of the laser output values. Note that in a case in which part of the laser module group is replaced, the laser beam is detected for the replaced laser module(s) Mx to detect the initial value of the laser output value thereof.

The computing unit 1A associates the detected initial values with the values of power to be supplied to the laser modules Mx on a per laser module Mx basis, and registers the resultant information in the correspondence relationship information in the memory unit 3A. In addition, the computing unit 1A stores the initial value of the coupled laser beam W10 in the memory unit 3A. The following description refers to the value of power, which is to be supplied to a laser module Mx upon detection of the initial value of the laser output value, as laser output condition A.

Assume here that the initial value of the output value of the laser beam Wx at a laser module Mx is $V_0(m)$ [kW], and that the initial value of the output value of the coupled laser beam W10 at the optical coupling unit 15 is $V_{a0}$ [kW], where m ranges from 1 to N when there are N laser modules Mx, and N is a natural number.

In addition, the computing unit 1A sets the measurement error range of the laser output values. An example of the measurement error range is X [%] or less. The computing unit 1A stores the measurement error range that has been set, in the memory unit 3A.

After registration of the initial state of the laser device 100A, each laser module Mx outputs a laser beam, thereby causing the coupled laser beam W10 to be output from the laser device 100A. The control device 5A then periodically checks the states of the laser modules Mx and the state of the optical coupling unit 15 at specific times such as once per day (step S20), and registers the states of the laser modules Mx and the state of the optical coupling unit 15. Specifically, the control device 5A stores the values of power to be supplied, the laser output values of the laser modules Mx, and the laser output value of the optical coupling unit 15, in the memory unit 3A.

An operation of checking the laser output values will next be described. At the time for checking the state of the laser device 100A, the control unit 2A supplies power to the drive power supplies 40x. In this operation, the control unit 2A supplies power equivalent to the laser output condition A to each of the drive power supplies 40x.

In the laser device 100A, the first output detection unit 51, the second output detection unit 52, and the third output detection unit 53 respectively detect the output values of the laser beams W1, W2, and W3 from the laser modules Mx, and send these output values to the computing unit 1A. In addition, the coupled output detection unit 55 detects the output value of the coupled laser beam W10 from the optical coupling unit 15, and sends the output value to the computing unit 1A. In this operation, the output values of the laser beams W1, W2, and W3 and of the coupled laser beam W10 are detected upon elapse of a specific time period after start-up of the laser modules Mx. That is, the output values of the laser beams W1, W2, and W3 and of the coupled laser beam W10 are detected after completion of a particular operation after start-up of the laser modules Mx. Assume here that the output value of the laser beam Wx at a laser module Mx is $V(m)$ [kW], and that the output value of the coupled laser beam W10 at the optical coupling unit 15 is $V_a$ [kW]. The computing unit 1A compares the output values calculated, with the output values stored in the memory unit 3A, and calculates an output change ratio, which indicates the degree of degradation of the laser module Mx, based on the result of the comparison.

The computing unit 1A herein calculates the output change ratio $\alpha(m)$ [%] of a laser module Mx by $\alpha(m)=1-V(m)/V_0(m)$, and calculates the output change ratio $\alpha_a$ [%] of the optical coupling unit 15 by $\alpha_a=1-V_a/V_{a0}$.

The computing unit 1A calculates the output correction factor of each laser module Mx using the output change ratio $\alpha(m)$ of each laser module Mx and using the output change ratio $\alpha_a$ of the optical coupling unit 15 (step S30). A processing procedure of calculation of the output correction factors will next be described.

Figure 5:
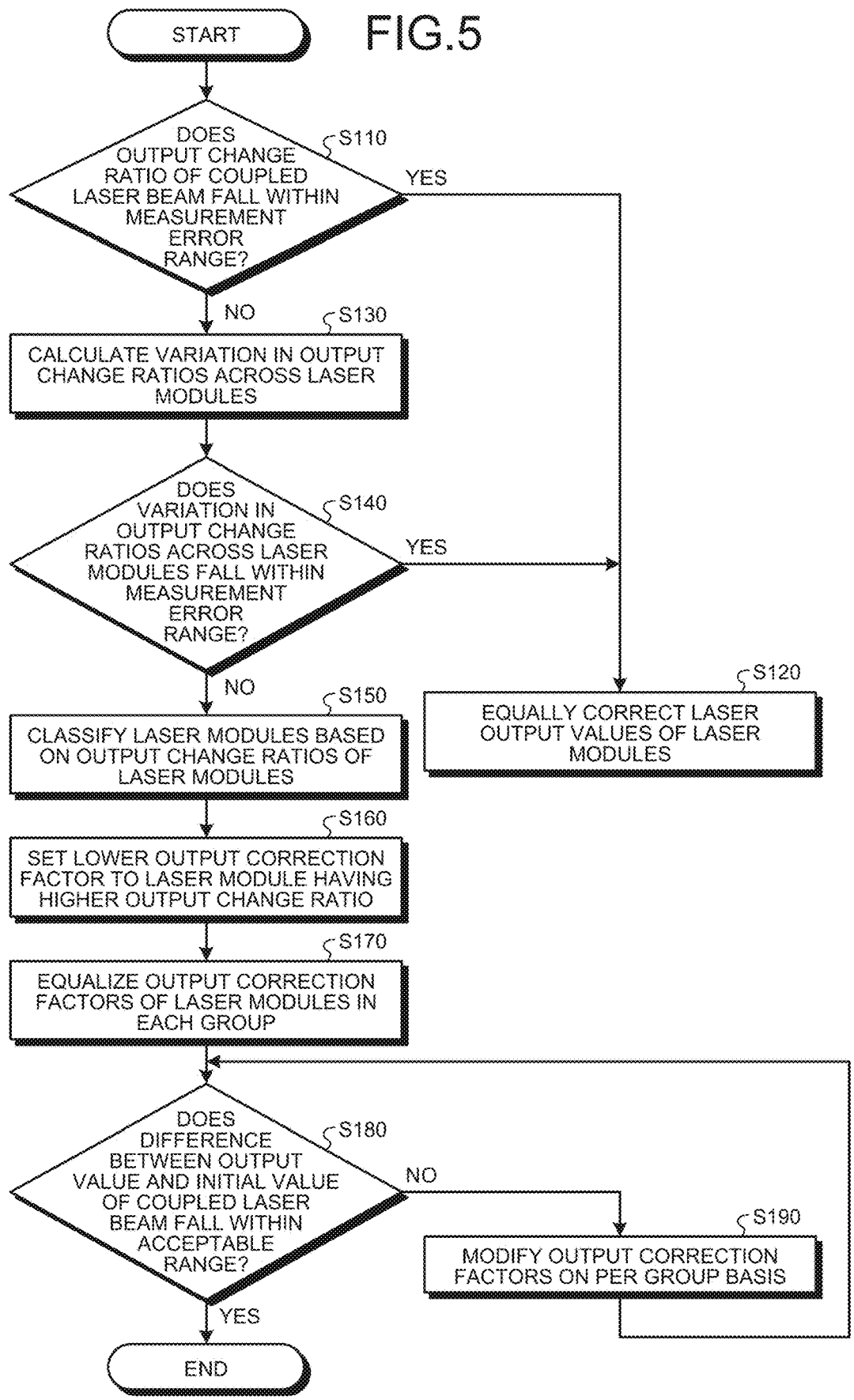
FIG. 5 is a flowchart illustrating a processing procedure of calculation of output correction factors performed by the laser device according to the embodiment.

FIG. 5 is a flowchart illustrating a processing procedure of calculation of the output correction factors performed by the laser device according to the embodiment. Due to similar processing performed by the laser device 100A and by the laser device 100B, the following description will focus on a processing procedure of calculation of the output correction factors performed by the laser device 100A.

The computing unit 1A determines whether the output change ratio $\alpha_a$ of the coupled laser beam W10 falls within a measurement error range (step S110). In this operation, the computing unit 1A determines whether a condition $\alpha_a \leq \pm X/m$ [%] is satisfied.

In a case in which the output change ratio $\alpha_a$ of the coupled laser beam W10 falls within the measurement error range (Yes at step S110), the computing unit 1A equally corrects the laser output values of the laser modules Mx (step S120). Specifically, the computing unit 1A sets a same output correction factor $\eta(m)=\eta_a=V_{a0}/V_a$ to the laser modules Mx. For example, if the output change ratio $\alpha_a$ of the coupled laser beam W10 indicates a 1% decrease, the computing unit 1A sets $\eta_a=100/99$ as the output correction factors $\eta(m)$.

In a case in which the output change ratio $\alpha_a$ of the coupled laser beam W10 exceeds the measurement error range (No at step S110), the computing unit 1A calculates variation of the output change ratios $\alpha(m)$ across the laser modules Mx (step S130). Specifically, the computing unit 1A calculates an average value $\alpha_{ave}$ [%], a maximum value $\alpha_{max}$ [%], and a minimum value $\alpha_{min}$ [%] of the output change ratios $\alpha(m)$ [%] of the laser module group. The computing unit 1A then calculates a variation $\beta$ [%] of the output change ratios $\alpha(m)$ across the laser modules Mx. An example of $\beta$ is $\beta=(\alpha_{max}-\alpha_{min})/\alpha_{ave}$.

The computing unit 1A determines whether the variation $\beta$ of the output change ratios $\alpha(m)$ falls within a measurement error range (step S140). In this operation, the computing unit 1A determines whether a condition $\beta \leq \pm X$ [%] is satisfied. In a case in which the variation $\beta$ of the output change ratios $\alpha(m)$ falls within the measurement error range (Yes at step S140), the computing unit 1A equally corrects the laser output values of the laser modules Mx (step S120).

In a case in which the variation $\beta$ of the output change ratios $\alpha(m)$ exceeds the measurement error range (No at step S140), the computing unit 1A classifies the laser modules Mx based on the output change ratios α(m) of the laser modules Mx (step S150).

An example of classification of the laser modules Mx will now be described. For example, the computing unit 1A selects a first laser module Mx from the laser module group, picks out a laser module Mx having an output change ratio different from the output change ratio of the first laser module Mx by X [%] or less, and registers the picked up laser module Mx as belonging to a first group together with the first laser module Mx. The computing unit 1A excludes the laser module(s) having been registered as belonging to that group from the laser module group, and then selects a second laser module Mx. The computing unit 1A then picks out a laser module Mx having an output change ratio different from the output change ratio of the second laser module Mx by X [%] or less, and registers the picked up laser module Mx as belonging to a second group together with the second laser module Mx. The computing unit 1A repeats this operation until each of all the laser modules Mx of the laser module group are registered as belonging to a certain group. This operation assumes that each group includes at least one laser module Mx registered as belonging thereto.

The computing unit 1A sets a lower output correction value to a laser module Mx having a higher output change ratio α (step S160). Specifically, the computing unit 1A assigns numbers to the laser modules Mx in descending order of the output change ratios α(m) thereof. In addition, the computing unit 1A calculates, for each laser module Mx, the output correction value for restoration of the laser output value to the initial value.

The computing unit 1A then sets, to the laser module Mx having the highest output change ratio α, the output correction value for the laser module Mx having the lowest output change ratio α. In addition, the computing unit 1A sets, to the laser module Mx having the lowest output change ratio α, the output correction value for the laser module Mx having the highest output change ratio α. Moreover, the computing unit 1A sets, to the laser module Mx having the second highest output change ratio α, the output correction value for the laser module Mx having the second lowest output change ratio α. Furthermore, the computing unit 1A sets, to the laser module Mx having the second lowest output change ratio α, the output correction value for the laser module Mx having the second highest output change ratio α.

The computing unit 1A repeats such swap operation of output correction values until the output correction values are set to all the laser modules Mx of the laser module group. Then, the computing unit 1A equalizes the output correction factors η(m) of the laser modules Mx in each group (step S170). That is, the computing unit 1A sets a same output correction factor η(m) to the laser modules Mx registered as belonging to a same group.

In addition, the computing unit 1A calculates the output value of the coupled laser beam W10 obtained by correcting the laser outputs using the output correction values set to the laser modules Mx. Specifically, the computing unit 1A sums up the laser output values obtained by correcting the laser outputs using the output correction values set to the laser modules Mx thus to calculate the output value of the coupled laser beam W10. The computing unit 1A determines whether the difference between the calculated output value of the coupled laser beam W10 and the initial value of the coupled laser beam W10 stored in the memory unit 3A falls within an acceptable range (step S180). An example of the acceptable range is the measurement error range.

In a case of being out of the acceptable range (No at step S180), the computing unit 1A modifies the output correction factors η(m) on a per group basis (step S190). This allows the output correction factors η(m) in each group to be equivalent to each other. The computing unit 1A repeats the operations of steps S180 and S190 until the difference between the calculated output value of the coupled laser beam W10 and the initial value of the coupled laser beam W10 stored in the memory unit 3A falls within the acceptable range. When the difference falls within the acceptable range (Yes at step S180), the computing unit 1A fixes the output correction factors η(m), and terminates the process of setting of the output correction factors η(m). The control unit 2A calculates the values of power to be supplied corresponding to the output correction factors η(m), and sends the calculated values of power to be supplied, to the drive power supply group.

Note that it is assumed here that the computing unit 1A calculates the output correction factors η(m) and sends the values of the power corresponding to the output correction factors η(m) to the drive power supply group immediately after checking the states of the laser modules Mx and the state of the optical coupling unit 15. In addition, in performing the operations of steps S160, S170, and S190, the computing unit 1A sets the output correction factors η(m) so as not to exceed the upper limit value of the output correction factors η(m) stored in the memory unit 3A. Moreover, the computing unit 1A may skip the operations of steps S150 and S170. Furthermore, in performing the operation of step S190, the computing unit 1A may modify the output correction values not on a per group basis, but on a per laser module Mx basis.

In addition, in performing the operation of step S160, it suffices for the computing unit 1A to be capable of swapping the output correction values using at least two of the laser modules Mx. In this case, the computing unit 1A gives priority to a more degraded laser module Mx in swapping the output correction values.

Figure 6:
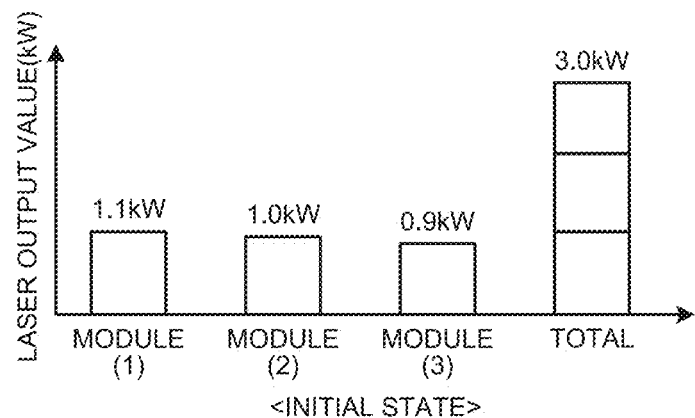
FIG. 6 is a diagram illustrating laser output values in an initial state of the laser device according to the embodiment.

A specific example of what output correction factors η(m) are to be set depending on the state of the laser device 100A will next be described. FIG. 6 is a diagram illustrating the laser output values in the initial state of the laser device according to the embodiment. Note that the following description refers to the first laser module M1 as laser module (1), the second laser module M2 as laser module (2), and the third laser module M3 as laser module (3). FIGS. 6 to 10 each indicate the first laser module M1 as module (1), the second laser module M2 as module (2), and the third laser module M3 as module (3). In the graphs illustrated in FIGS. 6 to 10, the vertical axis represents the laser output value (kW), i.e., the output value of the laser beam.

In the initial state, the laser device 100A is in a state in which the laser output thereof has not decreased due to degradation. The present embodiment assumes that, in the initial state, the laser module (1) has a laser output of 1.1 kW, the laser module (2) has a laser output of 1.0 kW, and the laser module (3) has a laser output of 0.9 kW. The sum of the laser output values in this case is 3.0 kW. The sum of the laser outputs is the output value of the coupled laser beam W10. Continued operation of the laser device 100A after registration of the initial state of the laser device 100A may cause degradation, thereby leading to one of the first to fourth states described below.

Figure 7:
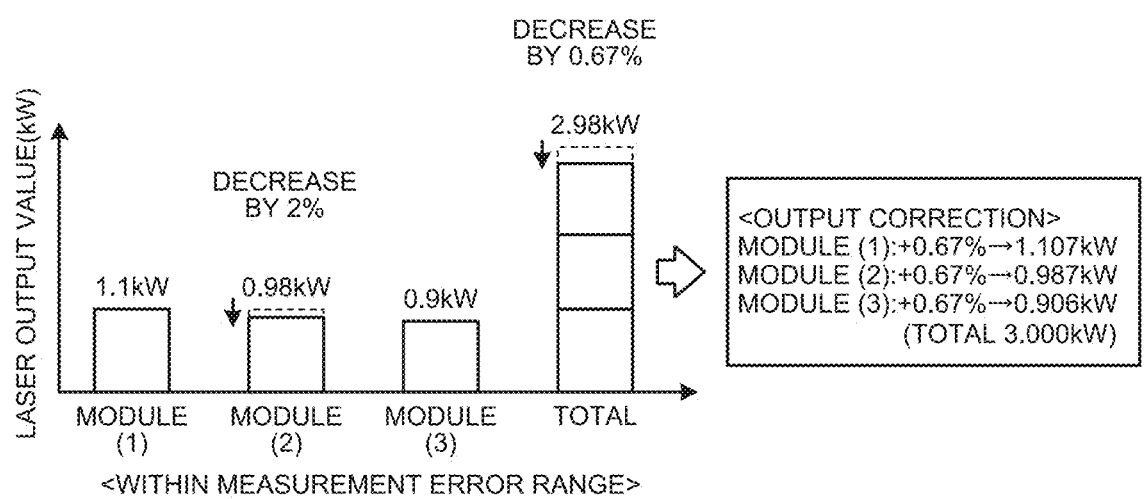
FIG. 7 is a diagram illustrating laser output values in a first state of the laser device according to the embodiment.

FIG. 7 is a diagram illustrating the laser output values in the first state of the laser device according to the embodiment. The first state of the laser device 100A is a state in which the output change ratio α(m) of each laser module Mx falls within the measurement error range.

The following description assumes that the laser output values of the laser modules (1) and (3) have not decreased, the laser output value of the laser module (2) has decreased by 2%, and thus the sum of the laser output values has thus decreased by 0.67%.

In the first state, the computing unit 1A sets a same output correction factor η(m) to each laser module Mx. In this case, the computing unit 1A sets, to each laser module Mx, an output correction factor η(m) that maintains a difference between the sum of the laser output values and the sum in the initial state within an acceptable range.

FIG. 7 illustrates a case in which the computing unit 1A has set an output correction factor η of +0.67% to each of the laser modules (1) to (3). This brings the laser output values after the correction of the outputs of the laser modules (1) to (3) respectively to 1.107 (kW), 0.987 (kW), and 0.906 (kW), and the sum after the correction of the outputs to 3.000 (kW).

Figure 8:
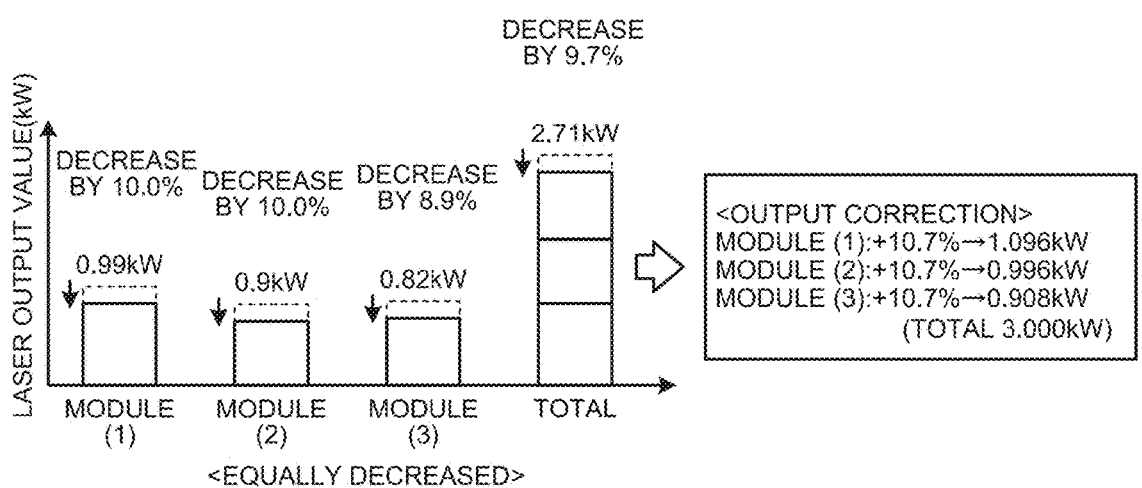
FIG. 8 is a diagram illustrating laser output values in a second state of the laser device according to the embodiment.

FIG. 8 is a diagram illustrating the laser output values in the second state of the laser device according to the embodiment. The second state of the laser device 100A is a state in which the laser output values of the laser modules Mx have equally decreased. That is, in the second state, the variation β in the decreasing ratios of the laser output values falls within a specific range.

The following description assumes that the laser output value of the laser module (1) has decreased by 10.0%, the laser output value of the laser module (2) has decreased by 10.0%, the laser output value of the laser module (3) has decreased by 8.9%, and the sum of the laser output values has thus decreased by 9.7%.

In the second state, the computing unit 1A sets a same output correction factor η(m) to each laser module Mx. In this case, the computing unit 1A sets, to each laser module Mx, an output correction factor η(m) that maintains the difference between the sum of the laser output values and the sum in the initial state within an acceptable range.

FIG. 8 illustrates a case in which the computing unit 1A has set an output correction factor η of +10.7% to each of the laser modules (1) to (3). This brings the laser output values after the correction of the outputs of the respective laser modules (1) to (3) to 1.096 (kW), 0.996 (kW), and 0.908 (kW), and the sum after the correction of the outputs to 3.000 (kW).

Figure 9:
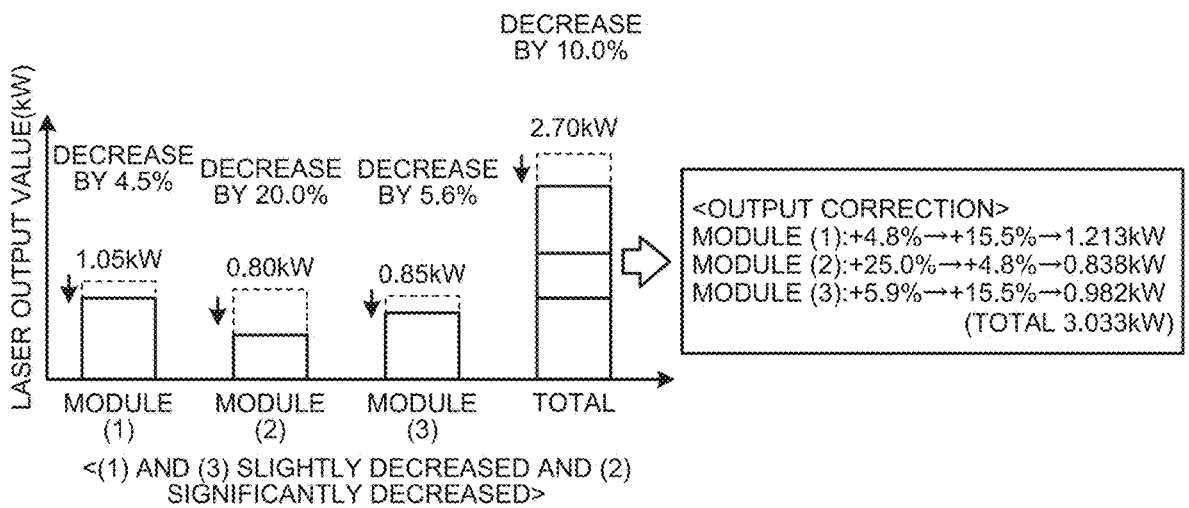
FIG. 9 is a diagram illustrating laser output values in a third state of the laser device according to the embodiment.

FIG. 9 is a diagram illustrating the laser output values in the third state of the laser device according to the embodiment. The third state of the laser device 100A is a state in which a group including a larger number of the laser modules Mx registered each having a laser output value slightly decreased, and a group including a smaller number of the laser modules Mx registered each having a laser output value significantly decreased are present. Assume that the laser modules (1) and (3) each having a laser output value slightly decreased are registered as belonging to the first group, and the laser module (2) having a laser output value significantly decreased is registered as belonging to the second group.

The following description assumes that the laser output value of the laser module (1) has decreased by 4.5%, the laser output value of the laser module (2) has decreased by 20.0%, the laser output value of the laser module (3) has decreased by 5.6%, and the sum of the laser output values has thus decreased by 10.0%.

In the third state, the computing unit 1A assigns numbers to the laser modules (1) to (3) in descending order of the output change ratios α(m). In this example, the output change ratios α(m) decrease in the order of the laser module (2), the laser module (3), and the laser module (1).

In addition, the computing unit 1A calculates an output correction value for restoration of the laser output value to the initial value, for each of the laser modules (1) to (3). Restoration of the laser output value of the laser module (1) to the laser output value in the initial state requires an output correction factor η of +4.8%. Restoration of the laser output value of the laser module (2) to the laser output value in the initial state requires an output correction factor η of +25.0%. Restoration of the laser output value of the laser module (3) to the laser output value in the initial state requires an output correction factor η of +5.9%.

The computing unit 1A sets, to the laser module (2) having experienced the highest output change ratio α, the output correction factor η of the laser module (1) having experienced the lowest output change ratio α. That is, the computing unit 1A sets the output correction factor η of +4.8% to the laser module (2).

In addition, the computing unit 1A sets, to the laser module (1) having experienced the lowest output change ratio α, the output correction factor η of the laser module (2) having experienced the highest output change ratio α. That is, the computing unit 1A tentatively sets an output correction factor η of +25.0% to the laser module (1).

Furthermore, because the laser modules (1) and (3) belong to a same group, the computing unit 1A modifies the output correction factors η of the laser modules (1) and (3) to bring the output correction factors η of the laser modules (1) and (3) to a same value, and the difference between the sum after the correction of the outputs and the sum in the initial state to fall within an acceptable range.

FIG. 9 illustrates a case in which the computing unit 1A has set a modified output correction factor η of 15.5% to each of the laser modules (1) and (3), and sets an output correction factor η of +4.8% to the laser module (2). This brings the laser output values after the correction of the outputs of the laser modules (1) to (3) respectively to 1.213 (kW), 0.838 (kW), and 0.982 (kW), and the sum after the correction of the outputs to 3.033 (kW).

Because the laser modules (1) and (3) each have a low output change ratio α, setting of a high output correction factor η thereto can still prevent accelerated degradation. Moreover, although the laser module (2) has a high output change ratio α, setting of a low output correction factor η can prevent accelerated degradation.

Figure 10:
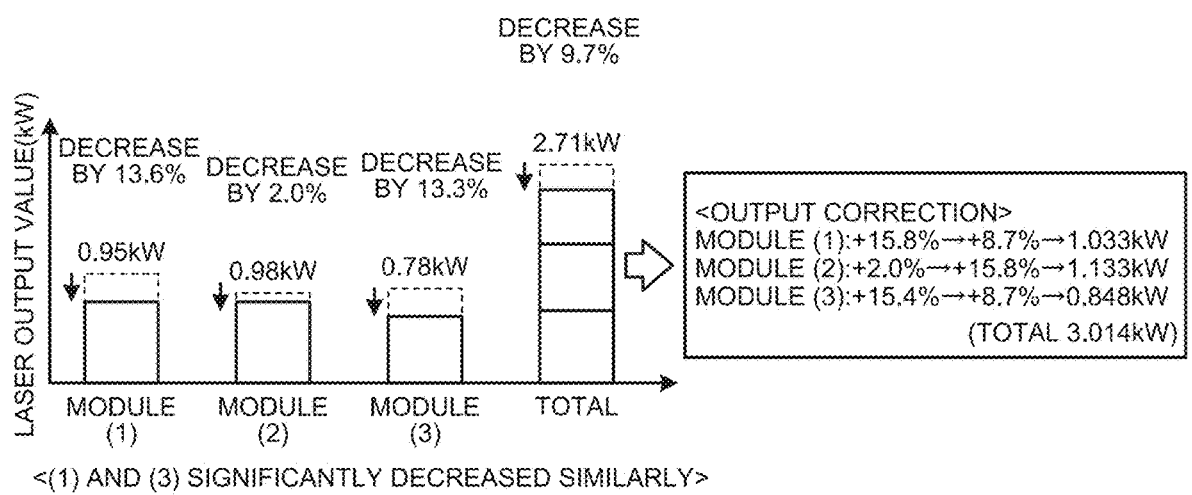
FIG. 10 is a diagram illustrating laser output values in a fourth state of the laser device according to the embodiment.

FIG. 10 is a diagram illustrating the laser output values in the fourth state of the laser device according to the embodiment. The fourth state of the laser device 100A is a state in which a group including a smaller number of the laser modules Mx registered each having a laser output value slightly decreased, and a group including a larger number of the laser modules Mx registered each having a laser output value significantly decreased are present. Assume that the laser modules (1) and (3) each having a laser output value significantly decreased are registered as belonging to the first group, and the laser module (2) having a laser output value slightly decreased is registered as belonging to the second group.

The following description assumes that the laser output value of the laser module (1) has decreased by 13.6%, the laser output value of the laser module (2) has decreased by 2.0%, the laser output value of the laser module (3) has decreased by 13.3%, and the sum of the laser output values has thus decreased by 9.7%.

In the fourth state, the computing unit 1A assigns numbers to the laser modules (1) to (3) in descending order of the output change ratios α(m). In this example, the output change ratios α(m) decrease in the order of the laser module (1), the laser module (3), and the laser module (2).

In addition, the computing unit 1A calculates an output correction value for restoration of the laser output value to the laser output value in the initial state, for each of the laser modules (1) to (3). Restoration of the laser output value of the laser module (1) to the laser output value in the initial state requires an output correction factor η of +15.8%. Restoration of the laser output value of the laser module (2) to the laser output value in the initial state requires an output correction factor η of +2.0%. Restoration of the laser output value of the laser module (3) to the laser output value in the initial state requires an output correction factor η of +15.4%.

The computing unit 1A sets, to the laser module (2) having experienced the lowest output change ratio α, the output correction factor η of the laser module (1) having experienced the highest output change ratio α. That is, the computing unit 1A sets the output correction factor η of +15.8% to the laser module (2).

In addition, the computing unit 1A sets, to the laser module (1) having experienced the highest output change ratio α, the output correction factor η of the laser module (2) having experienced the lowest output change ratio α. That is, the computing unit 1A tentatively sets an output correction factor η of +2.0% to the laser module (1).

Furthermore, since the laser modules (1) and (3) belong to a same group, the computing unit 1A modifies the output correction factors η of the laser modules (1) and (3) to bring the output correction factors η of the laser modules (1) and (3) to a same value, and the difference between the sum after the correction of the outputs and the sum in the initial state to fall within an acceptable range.

FIG. 10 illustrates a case in which the computing unit 1A has set a modified output correction factor η of 8.7% to each of the laser modules (1) and (3), and sets an output correction factor η of +15.8% to the laser module (2). This brings the laser output values after the correction of the outputs of the respective laser modules (1) to (3) respectively to 1.033 (kW), 1.133 (kW), and 0.848 (kW), and the sum after the correction of the outputs to 3.014 (kW).

Because the laser module (2) has a low output change ratio α, setting of a high output correction factor η can still prevent accelerated degradation. Moreover, although the laser modules (1) and (3) each have a high output change ratio α, setting of a low output correction factor η can prevent accelerated degradation.

As described above, in the present embodiment, the output correction factors η of the laser modules Mx are modified to reduce the burden on a largely-degraded laser module Mx of the laser modules Mx caused by correction of the outputs of the laser beams. In addition, the output correction factors η are modified to maintain the output value of the coupled laser beam W10 within an acceptable range.

A hardware configuration of the control devices 5A and 5B will now be described. The control devices 5A and 5B can each be implemented in control circuitry, i.e., a processor and a memory. Note that the processor and the memory may be replaced with processing circuitry. The computing units 1A and 1B may also be implemented in control circuitry. The functionality of the control devices 5A and 5B and the computing units 1A and 1B may be partially implemented in a dedicated hardware element, and partially implemented in software or firmware.

As described above, in the present embodiment, the output value of the coupled laser beam W10 is maintained within an acceptable range, and a lower output correction factor η is set to a laser module Mx having a higher output change ratio α, based on the laser output values of the laser modules Mx, on the output change ratios α(m) of the laser modules Mx, and on the initial value of the output value of the coupled laser beam W10. Because the computing unit 1A is capable of modifying the output correction factors η(m) of the laser modules Mx depending on degradation situations of the laser modules Mx, the load on a laser module Mx having a short life expectancy can be reduced depending on a difference in life expectancy among the laser modules Mx. This can prevent accelerated degradation of the laser modules Mx while maintaining the laser output value of the optical coupling unit 15 within an acceptable range.

In addition, capability of preventing accelerated degradation of the laser modules Mx can prevent a sudden failure of the laser device 100A, thereby ensuring a time for preparing for replacement of the laser module Mx. That is, replacement can be postponed from the start of degradation to the occurrence of failure of the laser module Mx.

Moreover, capability of comparing the states of the laser modules Mx with the initial states of the laser modules Mx allows degradation condition of each laser module Mx to be accurately identified. In other words, degradation condition can be accurately identified on a per laser module Mx basis even after part of the laser modules Mx in the laser module group is replaced.

Furthermore, in the present embodiment, the output values of the laser beams W1, W2, and W3 and of the coupled laser beam W10 are detected upon elapse of a specific time period after start-up of the laser modules Mx, and the output correction factors η(m) are calculated immediately after the detection to correct the values of the power for the drive power supply group. This enables the laser output values to be detected while maintaining, at a constant level, conditions related to laser oscillation such as a water temperature condition of each laser module Mx. This enables highly-reliable output correction control to be provided to the drive power supply group with a reduced variation in the states of the laser modules Mx.

The configurations described in the foregoing embodiment are merely examples of the aspects of the present invention. These configurations may be combined with another known technology, and moreover, a part of such configurations may be omitted and/or modified without departing from the spirit of the present invention.

REFERENCE SIGNS LIST 1A, 1B computing unit; 2A, 2B control unit; 3A, 3B memory unit; 5A control device; 15 optical coupling unit; 41 first drive power supply; 42 second drive power supply; 43 third drive power supply; 51 first output detection unit; 52 second output detection unit; 53 third output detection unit; 55 coupled output detection unit; 61-63, 65 partial reflection mirror; 100A, 100B laser device; 110 machining apparatus drive unit; 111 transmission fiber; 120A, 120B machining apparatus control device; 200A, 200B laser machining apparatus; M1 first laser module; M2 second laser module; M3 third laser module.

The invention claimed is:
1. A laser device including a plurality of laser modules, the laser device comprising:

a plurality of drive power supplies to drive the laser modules;

a plurality of laser output detectors to detect laser outputs from the laser modules, and to output detected values as first output signals;

a coupled output detector to detect a total laser output after coupling of a plurality of the laser outputs, and to output a detected value as a second output signal;

a memory to store first initial values, being initial values of the first output signals detected by the laser output detection detectors on a per laser module basis, and a second initial value, being an initial value of the second output signal detected by the coupled output detector;

a processing circuitry to set a plurality of output correction factors for correspondingly controlling the laser modules using the first output signals and the second output signal; and to control the plurality of drive power supplies using the plurality of output correction factors, wherein laser modules of the plurality of laser modules whose laser outputs have output change ratios different from each other by a specific value or less are classified as belonging to a same group, and the plurality of output correction factors are set, on a per group basis, to allow the total laser output to be maintained at a constant value, and the processing circuitry sets the plurality of output correction factors to cause a group having higher change ratios with respect to initial values of the laser outputs to be assigned a lower output correction factor.

2. The laser device according to claim 1, further comprising:

the memory stores data of the laser outputs of the plurality of laser modules, of values of power to be supplied by the drive power supplies, and of the total laser output.

3. A laser machining apparatus comprising:

a laser device including a plurality of laser modules;

a machining apparatus to perform machining of an item to be worked by a laser beam output from the laser device; and a machining apparatus controller to control the machining apparatus, wherein the laser device includes a plurality of drive power supplies to drive the laser modules;

a plurality of laser output detectors to detect laser outputs from the plurality of laser modules, and to output detected values as first output signals;

a coupled output detector to detect a total laser output after coupling of a plurality of the laser outputs, and to output a detected value as a second output signal;

a memory to store first initial values, being initial values of the first output signals detected by the plurality of laser output detectors on a per laser module basis, and a second initial value, being an initial value of the second output signal detected by the coupled output detector;

a processing circuitry to set a plurality of output correction factors for correspondingly controlling the laser modules using first output signals and the second output signal; and to control the plurality of drive power supplies using the plurality of output correction factors, wherein laser modules of the plurality of laser modules whose laser outputs have output change ratios different from each other by a specific value or less are classified as belonging to a same group, and the plurality of output correction factors are set, on a per group basis, to allow the total laser output to be maintained at a constant value, and the processing circuitry sets the plurality of output correction factors to cause a group having higher change ratios with respect to initial values of the laser outputs to be assigned a lower output correction factor.

4. A method for controlling an output of a laser device, the method comprising:

setting reference information of a device status of the laser device including a plurality of laser modules;

storing the reference information in a memory;

periodically checking the device status;

comparing the device status identified by the checking, with the reference information on a per laser module basis; and calculating a plurality of output correction factors for correspondingly controlling the plurality of laser modules based on a result of the comparison, wherein the device status of the laser device includes correspondence relationship information that represents correspondence relationship between power to be supplied to drive power supplies that drive the plurality of laser modules and laser outputs of the plurality of laser modules, laser outputs detected on a per laser module basis, and a total laser output after coupling of the laser outputs from the plurality of laser modules, the reference information includes the correspondence relationship information in an initial state, initial values of the laser outputs detected on a per laser module basis, and an initial value of the total laser output, and the plurality of output correction factors calculated are correction factors for the laser outputs of the plurality of laser modules, corresponding to the device status, laser modules of the plurality of laser modules whose laser outputs have output change ratios different from each other by a specific value or less are classified as belonging to a same group, and the plurality of output correction factors are set, on a per group basis, to cause the total laser output to be maintained at a constant value, and the plurality of output correction factors are set to cause a group having higher change ratios with respect to initial values of the laser outputs to be assigned a lower output correction factor.

5. The method for controlling the output of the laser device according to claim 4, wherein the calculating the output correction factors calculates the plurality of output correction factors not to exceed an upper limit value.

6. The method for controlling the output of the laser device according to claim 4, wherein the setting the reference information sets the reference information of the device status at a time point that is set based on an expected lifetime of each of the laser modules.

7. The method for controlling the output of the laser device according to claim 4, wherein the periodically checking the device status checks the device status after a particular operation that is performed after start-up of the plurality of laser modules.

8. The method for controlling the output of the laser device according to claim 5, wherein the setting the reference information sets the reference information of the device status at a time point that is set based on an expected lifetime of each of the laser modules.

9. The method for controlling the output of the laser device according to claim 5, wherein
the periodically checking the device status checks the device status after a particular operation that is performed after start-up of the plurality of laser modules.

10. The method for controlling the output of the laser device according to claim 6, wherein
the periodically checking the device status checks the device status after a particular operation that is performed after start-up of the plurality of laser modules.

11. The method for controlling the output of the laser device according to claim 8, wherein
the periodically checking the device status checks the device status after a particular operation that is performed after start-up of the plurality of laser modules.

* * * * *